United States Patent
Salisbury et al.

(10) Patent No.: US 7,311,367 B2
(45) Date of Patent: Dec. 25, 2007

(54) APPARATUS AND METHODS FOR SENSING AND CLAMPING DISCS

(75) Inventors: Phillip C. Salisbury, Golden Valley, MN (US); Douglas J. Lenz, Prior Lake, MN (US); John S. Lee, Coon Rapids, MN (US); Westin W. Nelson, Dayton, MN (US)

(73) Assignee: Rimage Corporation, Minneapolis, MN (US)

( * ) Notice: Subject to any disclaimer, the term of this patent is extended or adjusted under 35 U.S.C. 154(b) by 615 days.

(21) Appl. No.: 10/778,005

(22) Filed: Feb. 12, 2004

(65) Prior Publication Data

US 2005/0179709 A1 Aug. 18, 2005

(51) Int. Cl.
*B41J 3/00* (2006.01)
(52) U.S. Cl. .............................................. 347/2; 347/4
(58) Field of Classification Search ................ 347/104, 347/101, 8, 4, 153, 2; 400/120.16; 101/486
See application file for complete search history.

(56) References Cited

U.S. PATENT DOCUMENTS 5,542,768 A    8/1996   Rother et al.
6,709,175 B1 *  3/2004   Drynkin et al. ................ 400/48
2004/0061757 A1 *  4/2004   Yanagi et al. ............... 347/101

FOREIGN PATENT DOCUMENTS

EP    0 768 666 A2   4/1997
EP    1 380 432 A1   1/2004
WO    WO 03/091035 A1 * 11/2003

* cited by examiner

*Primary Examiner*—Manish S. Shah
(74) *Attorney, Agent, or Firm*—Leffert Jay Polglaze, P.A.

(57) ABSTRACT

Apparatus and methods are provided. At least one clamping finger of a movable tray of a compact disc printer pushes against an outer periphery of a compact disc disposed on a surface of the tray to clamp the compact disc between the clamping finger and a pair of studs that protrude from the surface of the tray and engage a periphery of a hole passing through a center of the compact disc. A carriage of the printer for moving an ink jet cartridge attached thereto across the compact disc to deposit an image on the compact disc may include a sensor. The sensor can be used to determine the presence of a compact disc on the tray, whether the compact disc is clamped to the tray, and a dimension of the compact disc, and to perform a calibration method.

12 Claims, 10 Drawing Sheets

APPARATUS AND METHODS FOR SENSING AND CLAMPING DISCS

TECHNICAL FIELD OF THE INVENTION

The present invention relates generally to compact disc printers and in particular the present invention relates to sensing and clamping discs.

BACKGROUND OF THE INVENTION

Compact disc publishing and replicating systems often use an ink jet printer to print a label directly on a compact disc (CD). This involves placing the disc on a movable tray and moving an ink jet cartridge over the disc to deposit ink droplets onto the disc as the tray moves the disc substantially perpendicular to the motion of the cartridge. One problem that can occur during printing is disc movement, which can cause blurred images, images printed atop other images, etc. Therefore, it is common to clamp the disc to the tray. However, many clamping mechanisms do not repeatedly clamp the discs in the same location on the tray. That is, the centers of successively clamped compact discs do not always coincide with substantially the same predetermined point on the tray that is used as a reference during printing. This may make it difficult to print an image in the same location on these discs. Moreover, many disc printers are not capable of verifying that a disc is correctly clamped on the tray.

It is often desirable to print on different size discs. One problem is identifying the disc size so that the printer deposits a correctly sized image on the disc. For example, the printer may be set for printing a large image on a small disc, which may cause ink to be deposited outside the boundaries of the disc, such as on the tray.

For the reasons stated above, and for other reasons stated below which will become apparent to those skilled in the art upon reading and understanding the present specification, there is a need in the art for alternatives to existing compact disc printers.

SUMMARY

The above-mentioned problems with compact disc printers and other problems are addressed by the present invention and will be understood by reading and studying the following specification.

One embodiment of the invention provides a compact disc printer having a movable tray to hold a compact disc for printing upon by the printer. At least one clamping finger is movably attached to the tray and is adapted to selectively engage an outer periphery of the compact disc. A pair of studs protrude from a surface of the tray for engaging a periphery of a hole passing through a center of the compact disc when the at least one clamping finger engages the outer periphery of the compact disc to clamp the compact disc between the at least one clamping finger and the pair of studs.

Another embodiment of the invention provides a method of clamping a compact disc to a printer that includes positioning the compact disc on a surface of a movable tray of the printer so that a pair of studs protruding from the surface of the tray extend into a hole passing through a center of the compact disc; and moving at least one clamping finger into engagement with an outer periphery of the compact disc so as to push the a periphery of a hole passing through a center of the compact disc against the pair of studs.

Another embodiment provides a method of operating a compact disc printer that includes emitting a beam of light onto a predetermined point on a movable tray of the printer from a sensor disposed on a carriage of the printer. The method includes indicating that the compact disc is clamped to the tray when a surface of a clamping finger coincides with the point and reflects the light back to the sensor, wherein when the clamping finger coincides with the point, the clamping finger is in engagement with an outer periphery of the compact disc. The method further includes indicating a clamping error when the surface of a clamping finger does not coincide with the point and the light is not reflected back to the sensor, wherein when the clamping finger does not coincide with the point, the clamping finger is not in engagement with the outer periphery of the compact disc.

Another embodiment provides a method of operating a compact disc printer that includes aligning a sensor with a predetermined first point on a movable tray of the printer. The predetermined first point is at a known first distance from a predetermined second point corresponding to a center of a compact disc when the compact disc is disposed on the tray. The first and second points coincide with a slot in the tray that is substantially parallel to a direction of motion of the tray. The sensor is disposed on a carriage of the printer. Emitting a beam of light from the sensor into the slot at the first point and moving the tray so that the beam of light moves within the slot toward the second point are included in the method. The method includes indicating that no compact disc is present when the beam of light arrives at the second point without being reflected. The method includes, when a compact disc is located on the tray, reflecting the beam of light back to the sensor from the compact disc when the beam of light encounters an outer periphery of the compact disc. Computing a dimension of the compact disc by subtracting a distance traveled by the tray between the first point and the outer periphery of the compact disc from the first distance is included in the method.

Further embodiments of the invention include methods and apparatus of varying scope.

DETAILED DESCRIPTION

Figure 1:
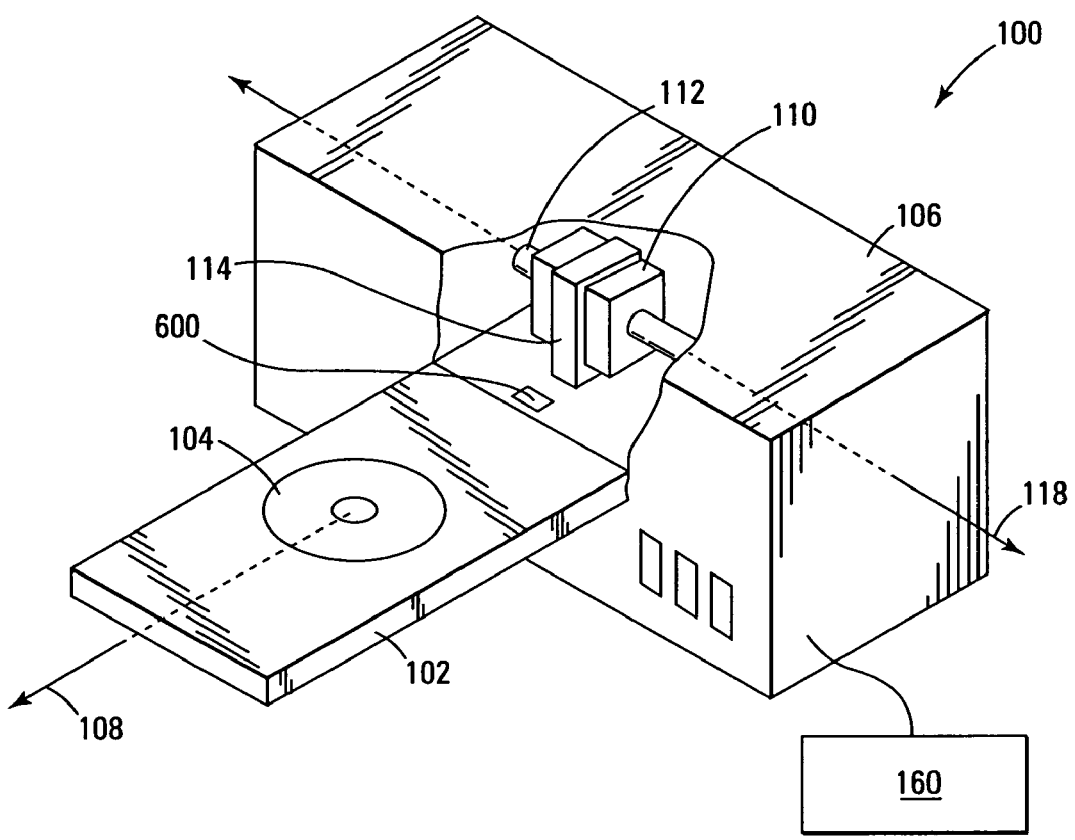
FIG. 1 illustrates an ink jet compact disc printer according to an embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates an ink jet compact disc printer 100 according to an embodiment of the present invention. A movable tray 102 of printer 100 carries a compact disc 104, such as but not limited to a CD, a CD-R, a DVD-R, etc., into and out of a housing 106 of printer 102 along an axis 108 that bisects compact disc 104. Compact disc 104 can be circular as shown and can have different diameters, such as 120 mm, 80 mm, etc. Alternatively, compact disc 104 can be square, rectangular, triangular, etc. Printer 100 has a print carriage 110 movably disposed on a rail 112 having a central axis 118 that is substantially perpendicular to axis 108, as shown by the cut-away of FIG. 1. An ink jet print cartridge 114 is removably attached to print carriage 110. During printing, print carriage 110 rides on rail 112 for conveying ink jet cartridge 114 across compact disc 104 to deposit ink onto compact disc 104 as tray 102 moves substantially perpendicular to the direction of motion of print carriage 110. For various embodiments, printer 100 is connectable to a computer 160.

Figure 2A:
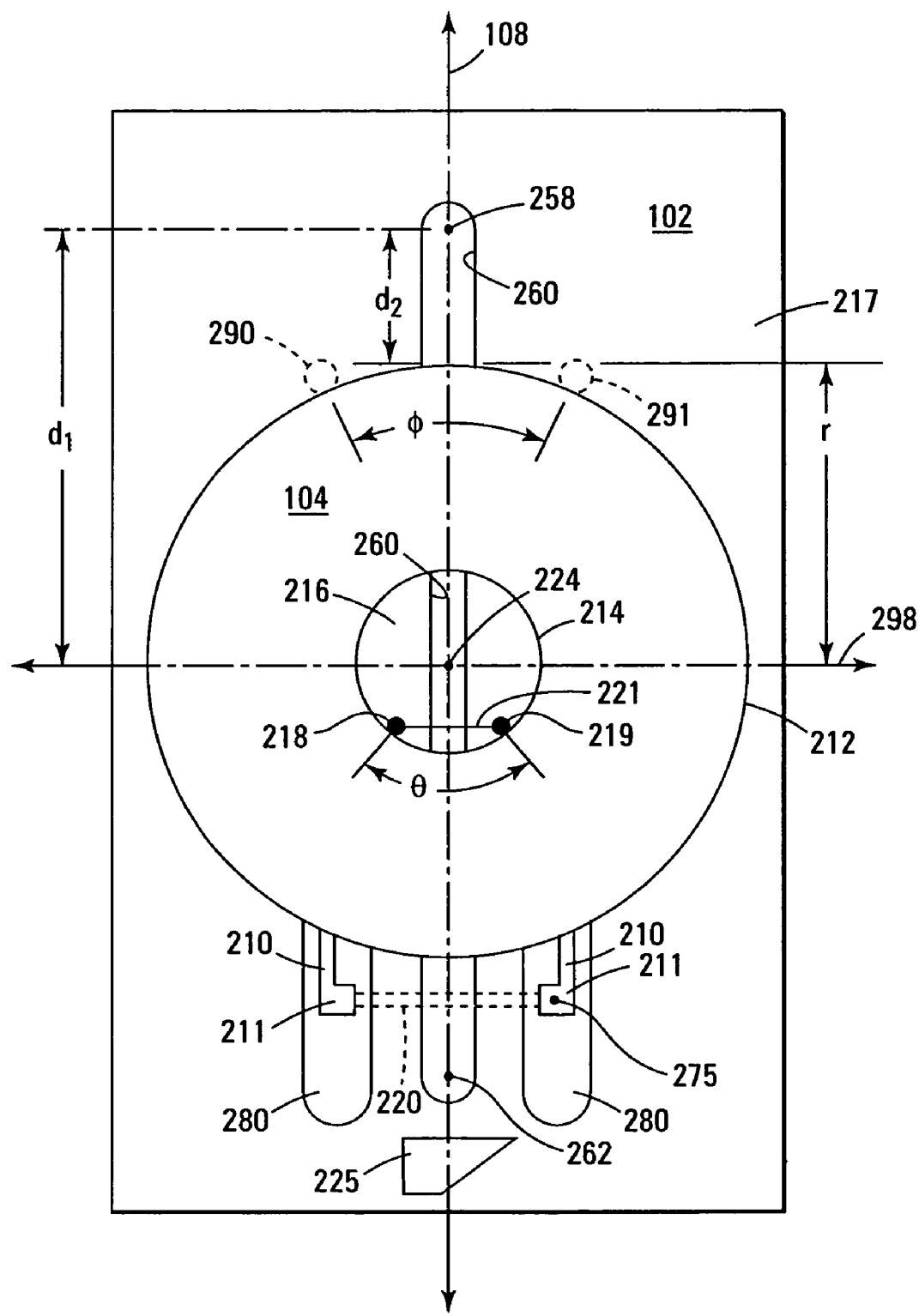
FIG. 2A is a top detailed view of a tray of a compact disc printer illustrating clamping of a circular compact disc to the tray according to another embodiment of the present invention.

FIG. 2A is a top detailed view of tray 102 illustrating clamping of compact disc 104 to tray 102, according to another embodiment of the present invention. To clamp compact disc 104 to tray 102, clamping fingers 210 are moved against an outer periphery 212 of compact disc 104 to urge a periphery 214 of a coaxial hole 216 passing though the center of compact disc 104 against stationary studs 218 and 219 protruding from a surface 217 of the tray. For one embodiment, fingers 210 are positioned to push compact disc 104, and thus periphery 214 of hole 216, against studs 218 and 219. Clamping compact discs in this fashion acts to ensure that successively clamped compact discs are positioned at substantially the same location on tray 102. That is, the centers of successively clamped compact discs coincide with substantially the same predetermined point on the tray 102.

For one embodiment, fingers 210 are mounted on a common shaft 220 that rotates fingers 210 against compact disc 104. For one embodiment, fingers 210 are integral with shaft 220. The present invention is not limited to two fingers, however. Rather, a single finger 210 may be used that is moved against compact disc 104, such as by rotation of a shaft that mounts the finger. As described below, at least one of fingers 210 has an extension (or sensing surface) 211 that is detectable by a sensor on carriage 110. The force exerted by one, two, or more clamping fingers 210 can be directed along a radius passing through a center 224 of compact disc 104, or the force can be directed at an angle to the radius, as long as there is a net force directed along a perpendicular bisector of a straight line 221 interconnecting studs 218 and 219.

Studs 218 and 219 are an angle θ apart, as measured around the periphery 214, and can be located on either side of the axis 108, as shown in FIG. 2A, or can be located on the same side of axis 108. Studs 218 and 219 can be symmetrically or asymmetrically disposed about axis 108. For another embodiment, the angle θ is about 90 degrees, but can range from about 30 degrees to about 150 degrees.

For another embodiment, clamping fingers 210 are moved against outer periphery 212 of compact disc 104 to urge, e.g., push, another portion of periphery 212 against stationary studs 290 and 291 protruding from surface 217 of the tray, as shown in FIG. 2A, instead of urging periphery 214 of hole 216 against studs 218 and 219. Studs 290 and 291 are an angle φ apart, as measured around the periphery 212, and can be located on either side of the axis 108, as shown in FIG. 2A, or can be located on the same side of axis 108. Studs 290 and 291 can be symmetrically or asymmetrically disposed about axis 108. The angle φ can range from about 30 degrees to about 150 degrees. For another embodiment, studs 290 and 291 are located on an opposite side of an axis 298 from clamping fingers 210, where axis 298 is substantially perpendicular to axis 108, bisects compact disc 104, and passes through center 224 of compact disc 104.

Figure 2B:
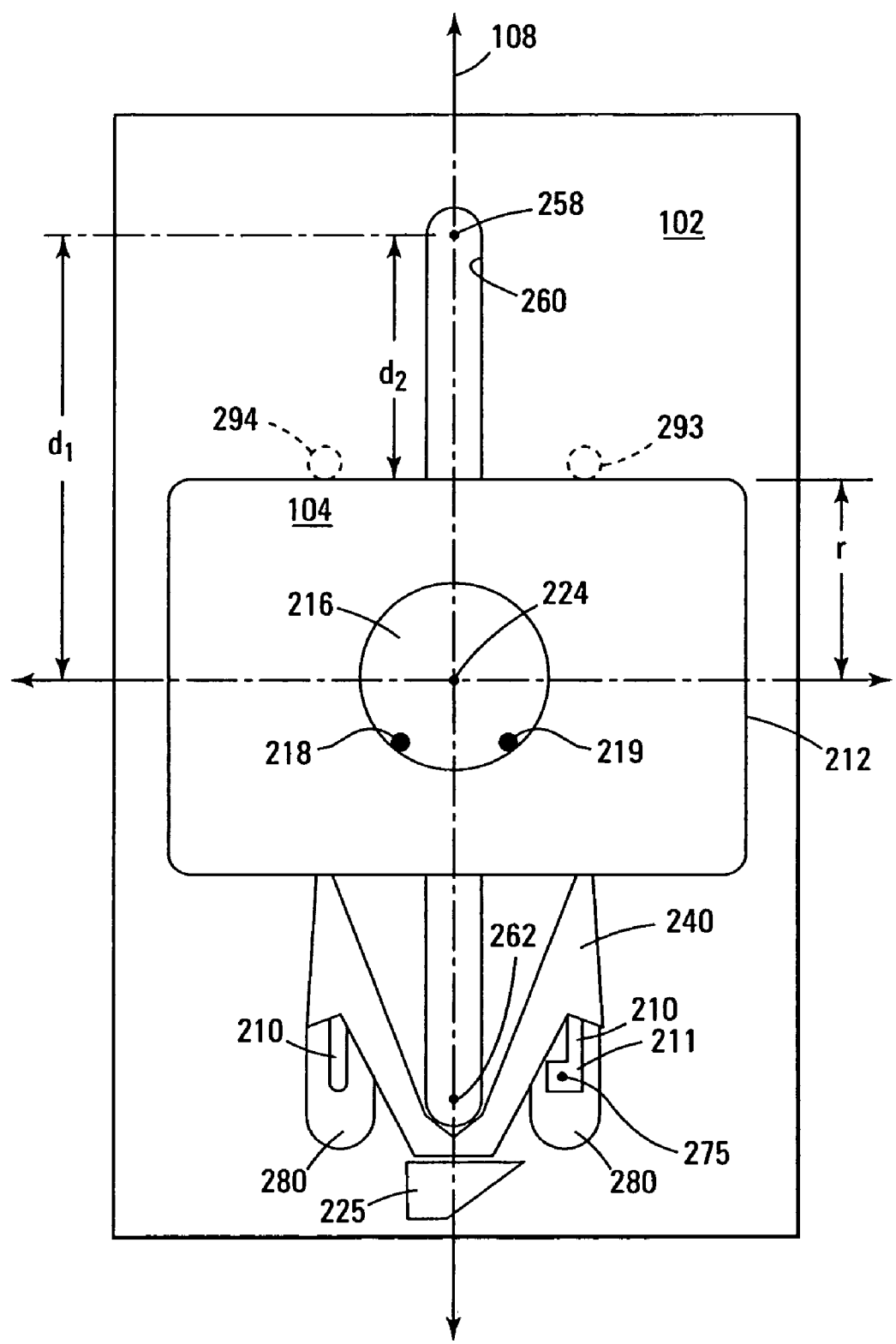
FIG. 2B is a top detailed view of a tray of a compact disc printer illustrating clamping of a rectangular compact disc to the tray according to another embodiment of the present invention.

FIG. 2B illustrates clamping of compact disc 104 when it has a rectangular shape according to another embodiment of the present invention. Elements common to FIGS. 2A and 2B are commonly numbered and are as described above. To clamp compact discs of different sizes and shapes, e.g., different from the size of the compact disc shown in FIG. 2A, an adaptor is 240 is disposed between clamping fingers 210 and the periphery 212 of the compact disc, as shown in FIG. 2B. For various embodiments, the adaptor is sized for different values of a dimension r of the compact disc, where r is the distance along axis 108, i.e., along the direction of travel of tray 102, between center 224 of compact disc 104 and periphery 212. Note that for circular compact discs the dimension r is the radius of the disc, whereas, for a square or a rectangular compact disc, the dimension r is half a side length of the square or rectangle. Clamping fingers 210, for one embodiment, push adaptor 240 against compact disc 104 so as to push periphery 214 of hole 216 against studs 218 and 219. For some embodiments, an aperture 225 is cut into tray 102, e.g., adjacent an end of tray 102 distally of the printer when the tray is extended, as shown in FIGS. 2A and 2B. In one embodiment, aperture 225 serves as a reference location on tray 102.

For another embodiment, clamping fingers 210 are or adaptor 240 is moved against outer periphery 212 of compact disc 104 to urge, e.g., push, another portion of periphery 212 against stationary studs 293 and 294 protruding from surface 217 of the tray, as shown in FIG. 2B, instead of urging periphery 214 of hole 216 against studs 218 and 219. Studs 293 and 294 can be located on either side of the axis 108, as shown in FIG. 2B, or can be located on the same side of axis 108. Studs 293 and 294 can be symmetrically or asymmetrically disposed about axis 108. For another embodiment, studs 293 and 294 are located on an opposite side of axis 298 from clamping fingers 210.

Tray 102 and the clamping features described above are not limited to compact disc printers with ink-jet cartridges and can be used with compact disc printers employing thermal transfer heads in conjunction with print ribbons or the like.

Figure 3:
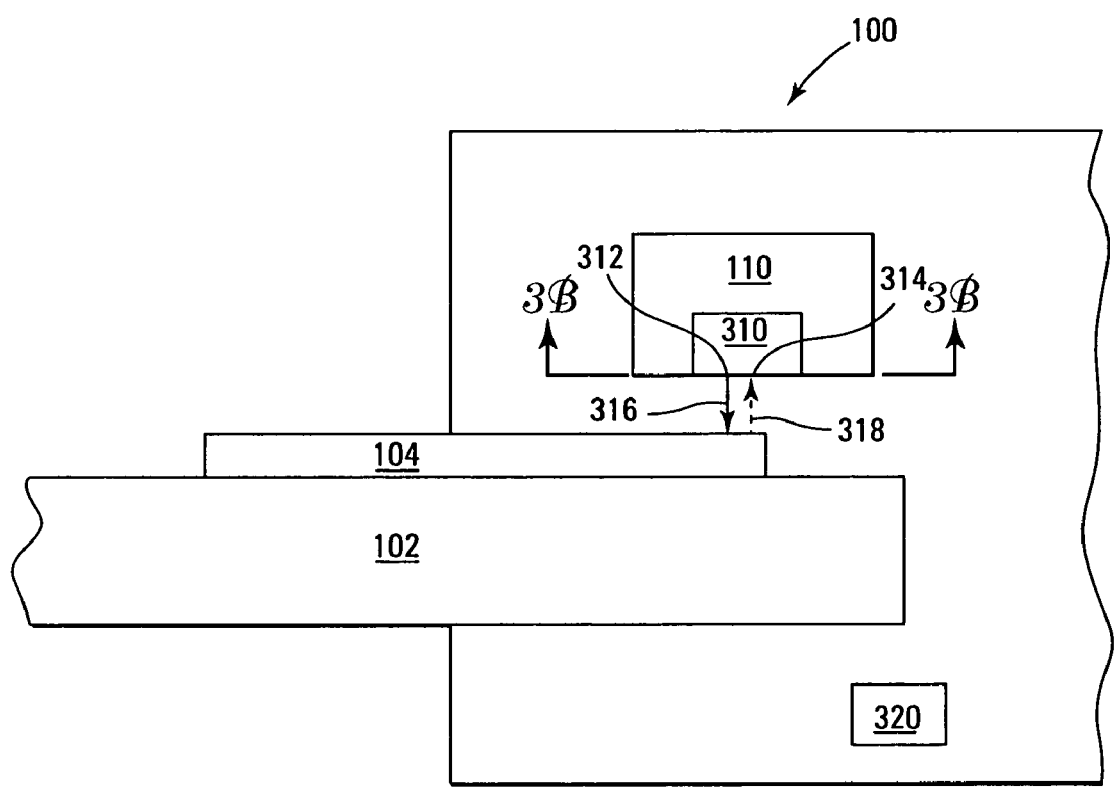
FIG. 3 is a side view of a portion of a compact printer according to another embodiment of the present invention.

FIG. 3 is a side view of a portion of printer 100. FIG. 3 shows that print carriage 110 has a sensor 310 for detecting the presence of a surface of an object and thereby an edge of the object, such as compact disc 104. Sensor 310 has an emitter 312 and a receiver 314. In operation, emitter 312 emits a beam of light 316. When beam of light 316 encounters a surface capable of reflecting the light, such as a surface of compact disc 104, the surface reflects the light, and receiver 314 captures the reflected light 318. Upon capturing the reflected light, sensor 310 sends a signal to a controller 320 of printer 100 indicating the presence of a surface. It should be noted that when the beam of light is emitted onto a non-reflective surface or into a slot, no light is reflected, the receiver does not detect any reflected light, and sensor 310 does not detect the presence of a surface.

Figure 4:
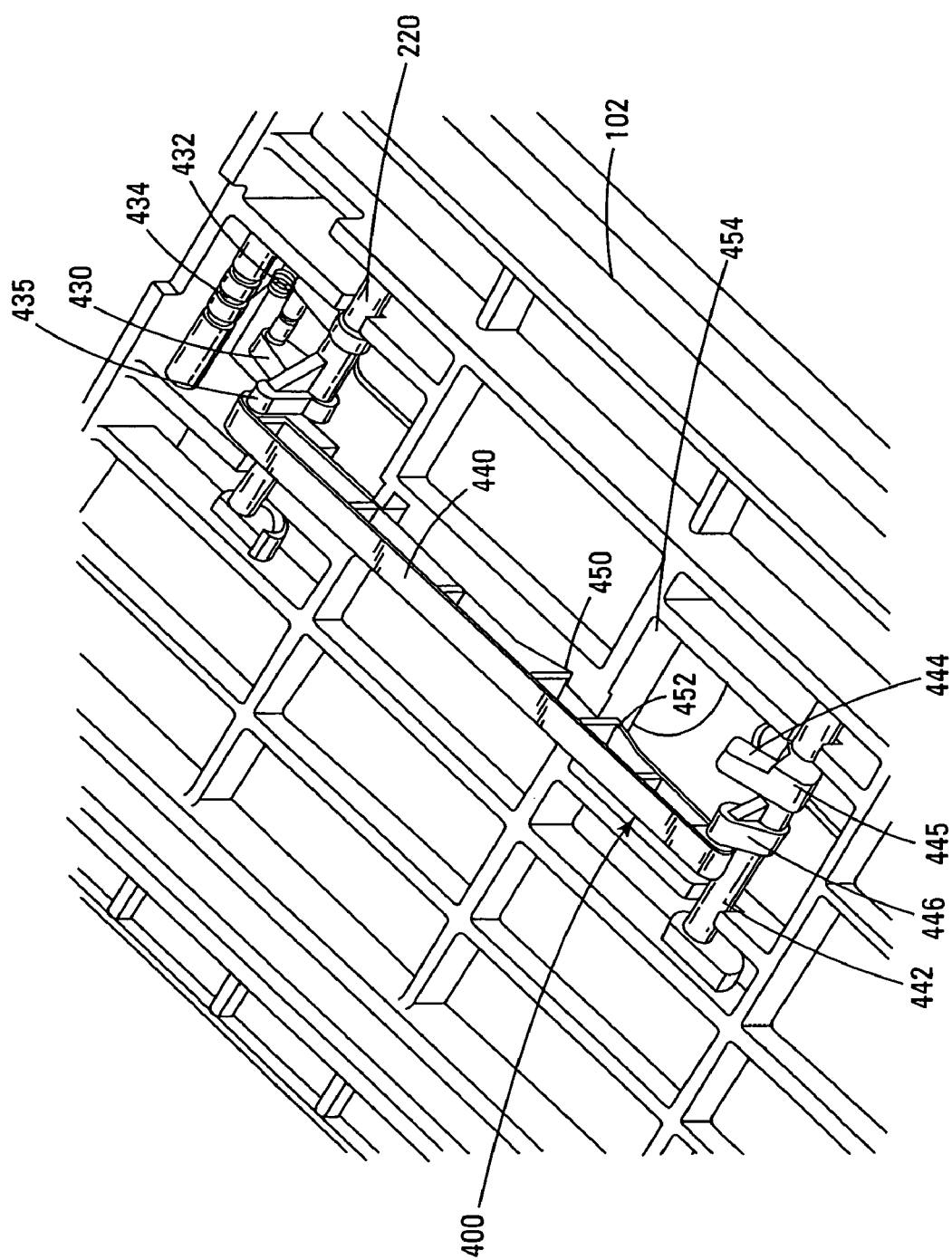
FIG. 4 is a bottom view of a portion of tray of a compact disc printer according to another embodiment of the present invention.
Figure 5:
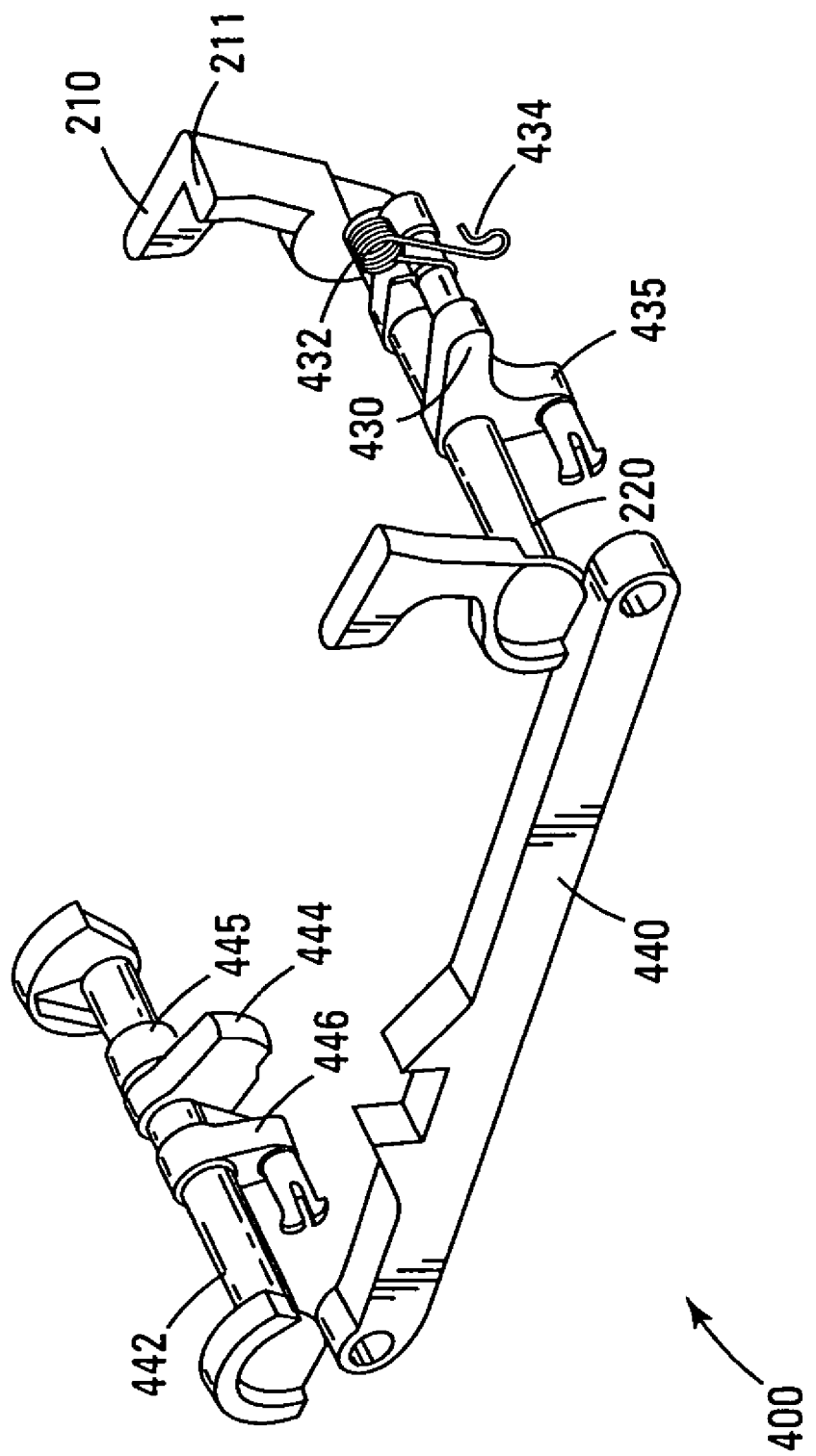
FIG. 5 is an exploded view of a clamping assembly of a compact disc printer according to another embodiment of the present invention.

FIG. 4 is a bottom view of a portion of tray 102 illustrating a clamping assembly 400 according to another embodiment of the present invention. FIG. 5 is an exploded view of the clamping assembly 400. Clamping assembly 400 includes the shaft 220 connected to the clamping fingers 210, as discussed above in conjunction with FIG. 2A. A moment arm 430 is connected to shaft 220. One or more springs 432, such as a torsion springs, are connected to shaft 220 by moment arm 430. Spring 432 is also connected to tray 102 by an end 434 of spring 432, as shown in FIG. 4. Spring 432 biases clamping fingers 210 against periphery 212 of compact disc 104. A link 440 movably connects shaft 220 to an actuating arm 446 that is connected to a shaft 442, as shown in FIGS. 4 and 5. That is, link 440 is movably connected to shaft 220 and shaft 442. Specifically, for one embodiment, link 440 is rotatably connected to a moment arm 435 that is connected to shaft 220, and link 440 is rotatably connected to a moment arm 446. Shaft 220 and shaft 442 are rotatably attached to tray 102. Actuating arms 444 and 445 are also connected to shaft 442, as shown in FIGS. 4 and 5. For one embodiment, actuating arms 444 and 445 and moment arm 446 are integral with shaft 442. As discussed below, actuating arms 444 and 445 respectively turn shaft 442 in opposite directions upon engaging stationary lugs attached to the printer 100.

Figure 6:
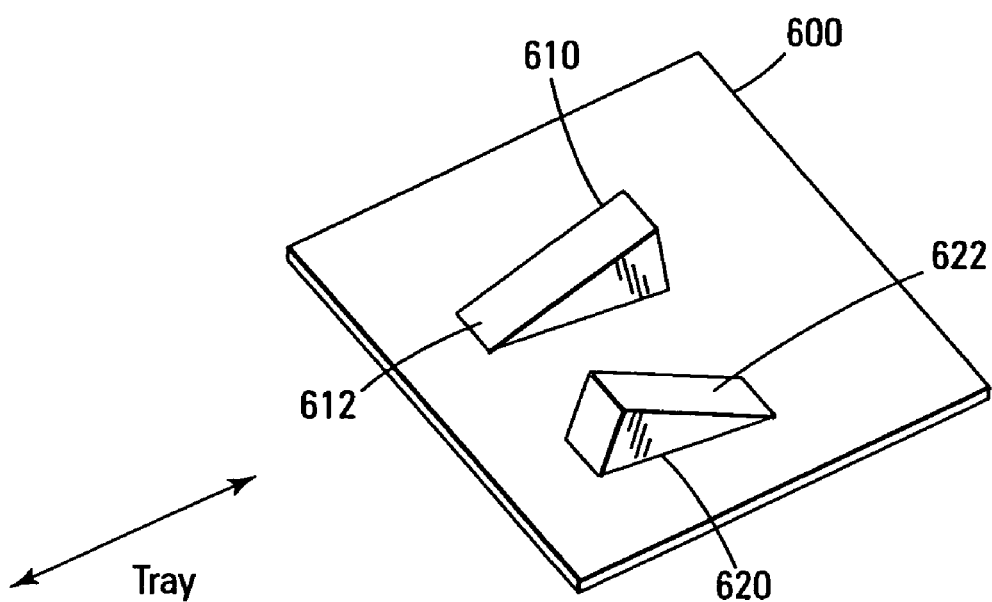
FIG. 6 is an enlarged detailed view of a region 600 of FIG. 1 according to another embodiment of the present invention.

FIG. 6 is an enlarged detailed view of region 600 of FIG. 1 according to another embodiment of the present invention. As tray 102 moves into and out of printer 100, it moves over region 600 and lugs 610 and 620 protruding from a stationary surface 605 of housing 106 of printer 100. For one embodiment, region 600 corresponds to a portion of a tray guide that is secured to housing 106.

As tray 102 moves into printer 100, actuating arm 445 of clamping assembly 400 engages an inclined surface 612 of lug 610, which exerts a force on actuating arm 445 that rotates shaft 442 relative to tray 102. Rotation of shaft 442 moves link 440 substantially parallel to tray 102 in a direction opposite the motion of tray 102. Link 440 then rotates shaft 220 in a first rotational direction to rotate clamping fingers 210, within slots 280 (shown in FIGS. 2A and 2B) disposed in tray 102, into contact with compact disc 104, as shown in FIGS. 2A and 2B. Rotation of shaft 220 in the first rotational direction moves spring 432 past a toggle point, shifting a net spring force to bias clamping fingers 210 against compact disc 104 or against adaptor 240. This net spring force provides the clamping force for clamping compact disc 104 to tray 102. If clamping fingers 210 do not engage compact disc 104 or against adaptor 240, rotation of shafts 220 and 442 continues until a stop 452 of link 440 engages a rib 454 of tray 102. As actuating arm 445 moves over inclined surface 622, actuating arm 444 moves over an inclined surface 612 of lug 610. Note that the rotatable connection between shaft 442 and link 440 converts the rotational motion of shaft 442 to a linear motion of link 440, and the rotatable connection between link 440 and shaft 220 converts the linear motion of link 440 to the rotational motion of shaft 220.

As tray 102 moves out of printer 100, actuating arm 444 of clamping assembly 400 engages inclined surface 622 of lug 620, which exerts a force on actuating arm 444 that rotates shaft 442 relative to tray 102. Rotation of shaft 442 moves link 440 substantially parallel to tray 102 in a direction opposite the motion of tray 102. Link 440 then rotates shaft 220 in a second rotational direction opposite the first rotational direction to bring clamping fingers 210 out of contact with compact disc 104. Rotation of shaft 220 in the second rotational direction moves spring 432 back past the toggle point, shifting the net force to bias clamping fingers 210 in an open position. Rotation of shafts 220 and 442 continues until a stop 450 of link 440 engages rib 454 of tray 102. As arm 444 moves over inclined surface 622 of lug 620, arm 446 moves over inclined surface 612 of lug 610.

It will be appreciated that clamping assembly 400 is not limited for use with two studs, e.g., studs 218 and 219. Rather fingers 210 can be used to force the periphery 214 of compact disc 104 against a single stud protruding from the tray surface.

When compact disc 104 is clamped on tray 102, a fixed distance $d_1$ (shown in FIGS. 2A and 2B) between a predetermined first point on tray 102 that substantially coincides with center point 224 and a predetermined second point 258 located on axis 108 is known. This enables measurement of the dimension r of compact disc 104 using sensor 310. Note that the predetermined first and second points are located within a slot 260 of tray 102 that is disposed along axis 108, where the predetermined second point 258 is adjacent an end of slot 260.

To measure the dimension r, carriage is positioned so that sensor 310 is aligned with axis 108, and tray 102 is positioned so that sensor 310 is aligned with point 258. Tray 102 is then moved into printer 100 while carriage 110 remains stationary. Meanwhile, sensor 310 emits a beam of light into slot 260 along axis 108 and does not detect anything because slot 260 does not reflect any of the light. When the beam of light encounters periphery 212 of compact disc 104, compact disc 104 reflects the beam of light, and receiver 314 captures the reflected light 318. Sensor 310 then sends a signal to controller 320 of printer 100 indicating the detection of periphery 212. If no disc is detected when tray 102 arrives at a position in which the beam of light is aligned with the predetermined second point 258, sensor 310 sends a signal to controller 320 indicating that there is no disc on tray 102. For an alternative embodiment, sensor 310 can be aligned with a point 262 located on axis 108 adjacent an opposite end of a slot 260, as shown in FIGS. 2A and 2B. In this embodiment, measurement of dimension r is accomplished as just described, except that tray 102 is moved out of printer 100 to move the light beam along axis 108.

In some embodiments, a stepping motor moves tray 102, where a number of rotations of the stepper motor is correlated to a distance $d_2$ moved by tray 102 in moving from where sensor 310 aligns with point 258 to periphery 212 of the compact disc 104. In these embodiments, controller 320 counts the number of rotations made by the stepper motor and subsequently computes the distance $d_2$ moved by tray 102. Controller 320 then computes the dimension r by subtracting $d_2$ from $d_1$. Controller then determines the type of compact disc by comparing the dimension r to dimensions of known compact disc types stored in a look-up table of the controller. For example, a particular dimension r specifies a square or rectangular compact disc with a half side length r, another a circular compact disc of radius r, etc. For other embodiments, controller sends the $d_2$ and $d_1$ measurements to the computer 160 for calculation of the dimension r and determination of the disc type.

For another embodiment of the present invention, sensor 310 is used to perform a calibration method for locating the center 224 of compact disc 104 while compact disc 104 is clamped on tray 102. The position of center 224 is stored, for example, in a non-volatile memory of controller 320 for use during printing to ensure that the printed image is located properly on the surface of compact disc 104.

A method of locating the center 224 is best described with reference to FIG. 7, which illustrates compact disc 104 clamped to tray 102. To locate the center 224, tray 102 and carriage 110 are positioned so that sensor 310 emits a light beam onto a point 710 located on the periphery 212 of the compact disc that is a distance Ex from the axis 108. Tray 102 is then moved into printer 100, with carriage 110 at a fixed position, so that the light beam moves substantially parallel to the axis 108 along a chord 715 of the compact disc, stopping at a point 720 on the periphery 212. The center 722 of chord 715, and thus the center of compact disc 104 in the direction of axis 108 (or the direction of motion of tray 102), is located on chord 715 halfway between points 710 and 720.

Figure 7:
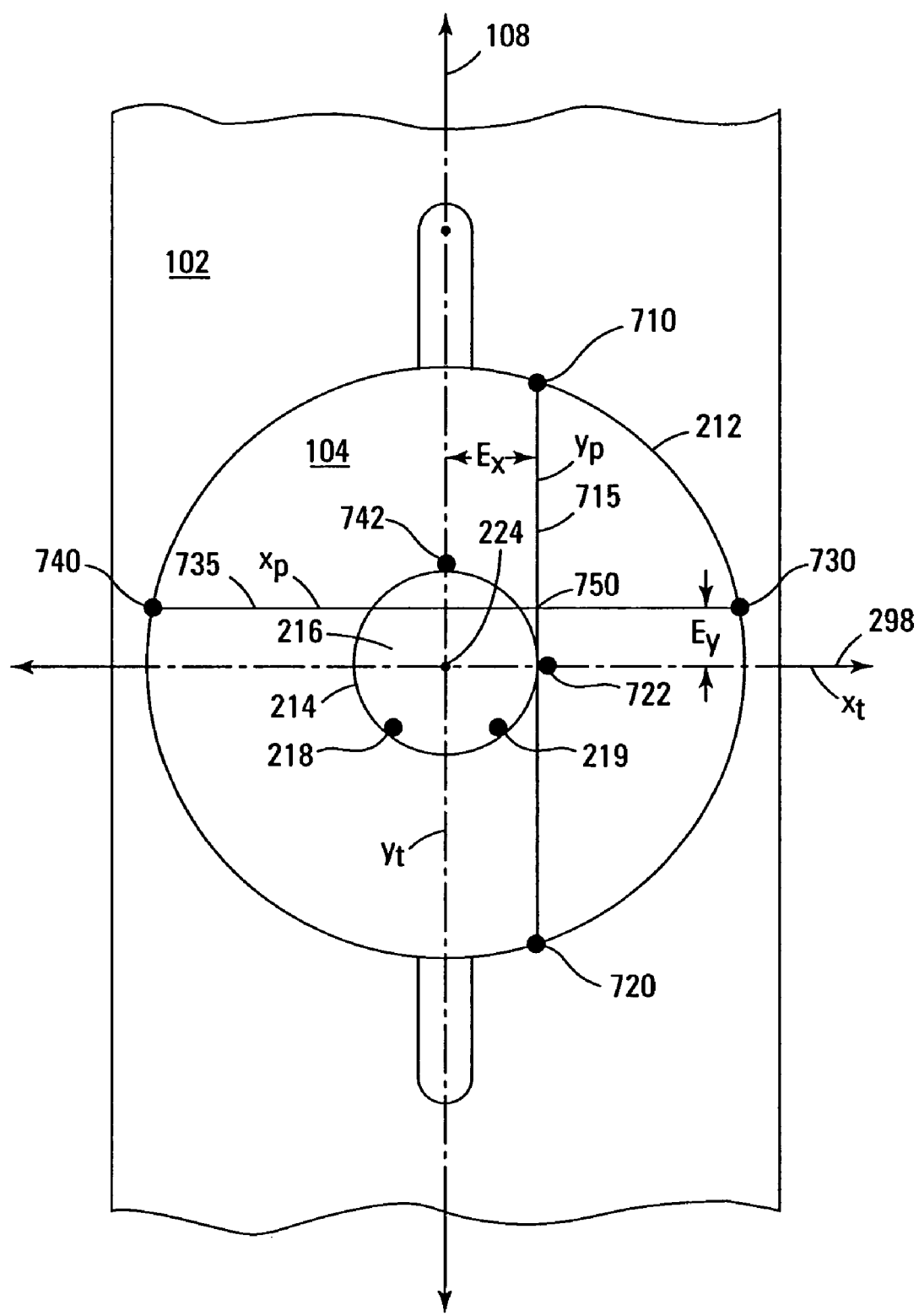
FIG. 7 is a top view of a compact disc clamped to a tray of a compact disc printer for illustrating a method performed by the printer according to another embodiment of the present invention.

Tray 102 and carriage 110 are then positioned so that sensor 310 emits a light beam onto a point 730 located on the periphery 212 that is a distance Ey from axis 298, as shown in FIG. 7. Carriage 110 is then moved across compact disc 104 substantially perpendicular to the direction of motion of tray 102, with tray 102 at a fixed position, so that the light beam moves substantially parallel to the axis 298 along a chord 735 of the compact disc, stopping at a point 740 on the periphery 212. The center 742 of chord 735 and thus the center of compact disc 104 in the direction of axis 298 (or the direction substantially perpendicular to the motion of tray 102) is located is located on chord 735 halfway between points 730 and 740. The center 224 is then located at the distance Ey from center 742 of chord 735 in the direction of axis 108, and the distance Ex from center 722 of chord 715 in the direction of axis 298.

The chords 735 and 715 respectively correspond to $x_p$ and $y_p$ coordinate axes of the coordinate system of a bit map of a printer driver on computer 160 corresponding to the printer 100, whereas axes 298 and 108 respectively correspond to $x_t$ and $y_t$ coordinate axes of tray 102. The distances Ex and Ey are stored in controller 320 and are used to transform the $x_p$ and $y_p$ coordinate axes to the $x_t$ and $y_t$ coordinate axes. That is, by translating the origin 750 of the $x_p$ and $y_p$ coordinate axes by the distance Ex along the $x_p$ axis and the distance Ey along the $y_p$ axis. This acts to properly locate the printed image on compact disc 104.

For another embodiment of the present invention, sensor 310 is used to determine whether or not compact disc 104 is clamped. This involves positioning tray 102 and carriage 110 so that sensor 310 emits a light beam onto a predetermined point 275 on tray 102, as shown in FIGS. 2A and 2B. When compact disc 104 is clamped, point 275 coincides with sensing region 211 of one or more of the clamping fingers 210, as shown in FIGS. 2A and 2B. Sensing surface 211 reflects the beam of light and receiver 314 captures the reflected light. Sensor 310 then sends a signal to controller 320 of printer 100 indicating that compact disc 104 is clamped.

Figure 8:
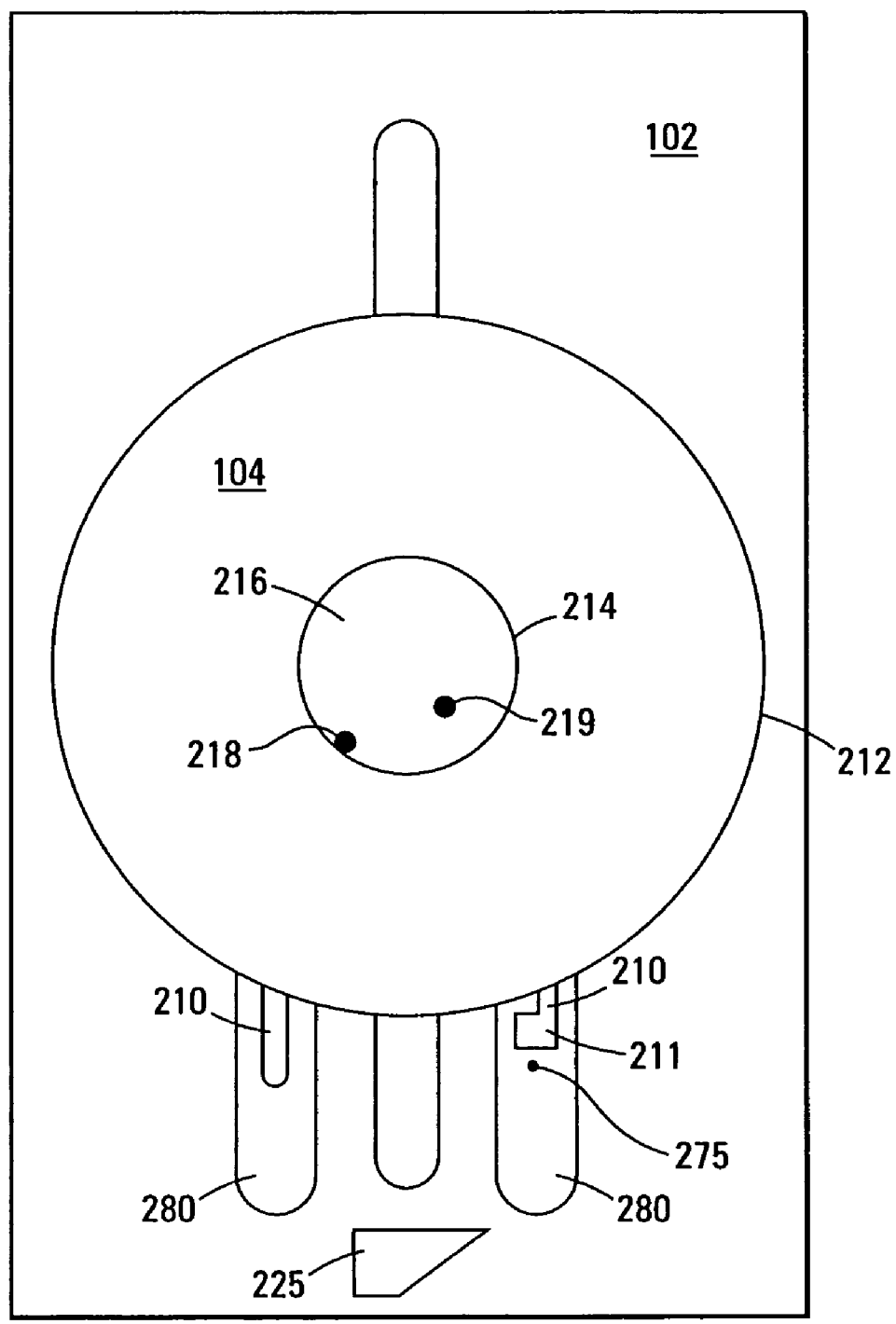
FIG. 8 illustrates a clamping error.

FIG. 8 illustrates a clamping error that can be detected with embodiments of the present invention. In FIG. 8, clamping fingers 210 have been actuated for clamping against periphery 212, but clamping fingers 210 are not in engagement with periphery 212. As such, the biasing force exerted on clamping fingers 210 by spring 432 moves sensing surface 211 of clamping fingers 210 past point 275 so that point 275 coincides with a portion of slot 280 in which the respective clamping finger moves, as shown in FIG. 8. Therefore, when sensor 310 emits the light beam onto point 275, the light beam is not reflected, as it is being emitted into slot 280. Sensor 310 then sends a signal to controller 320 of printer 100 indicating a clamping error. If clamping fingers fail to actuate into their clamping position, sensing surface 211 does not appear in slot 280, and again, the beam of light is emitted into slot 280 at point 275 and is not reflected.

Figure 9:
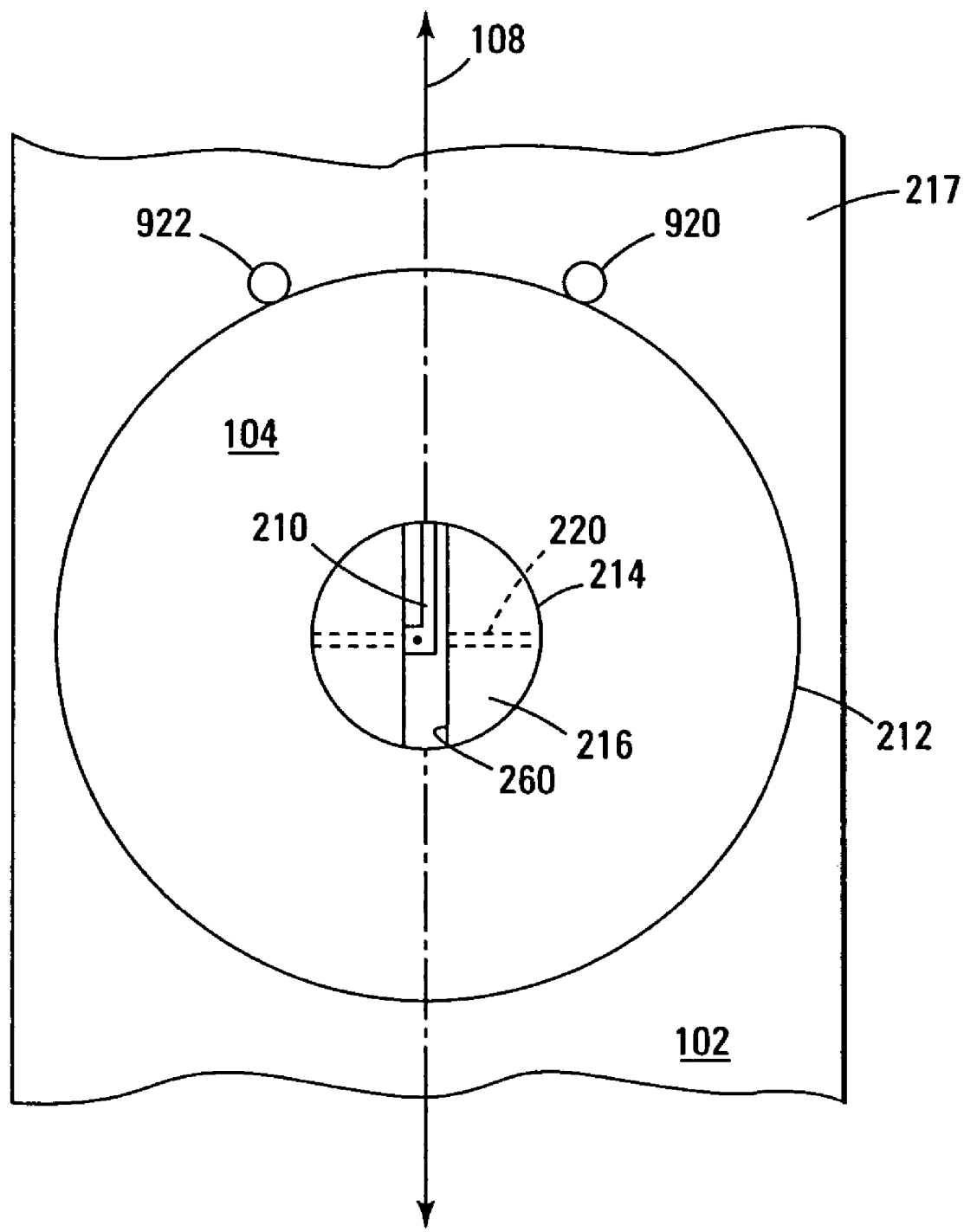
FIG. 9 illustrates clamping of a compact disc according to another embodiment of the present invention.

FIG. 9 illustrates clamping of compact disc 104 according to another embodiment of the present invention. To clamp compact disc 104 to tray 102, a single clamping finger 210 is moved against periphery 214 to push outer periphery 212 against stationary studs 920 and 922 protruding from surface 217 of the tray. This clamps compact disc 104 between clamping finger 210 and stationary studs 920 and 922. For other embodiments, a single stationary stud can be used in place of stationary studs 920 and 922. An adaptor, such as adaptor 240, can be disposed between studs 920 and 922 and outer periphery 212 when compact disc is of a different size and/or shape. For other embodiments, studs 920 and 922 are positioned as described above for studs 290 and 291 of FIG. 2A or studs 292 and 293 of FIG. 2B. Note that clamping finger 210 moves in the slot 260. Also clamping errors and verification of clamping can be accomplished using sensor 310, as described above. That is, reflecting beam of light 316 off sensing surface 211 indicates that compact disc is clamped. For a clamping error, beam of light 316 is emitted into slot 260 and cannot be reflected, indicating a clamping error.

CONCLUSION

Apparatus and methods are provided for compact disc printers. For one embodiment, at least one clamping finger of a movable tray of a compact disc printer pushes against an outer periphery of a compact disc disposed on a surface of the tray to clamp the compact disc between the clamping finger and a pair of studs that protrude from the surface of the tray and engage a periphery of a hole passing through a center of the compact disc. Using a pair of studs to engage the periphery of the hole passing through a center of the compact disc acts to ensure that successively clamped compact discs are positioned at substantially the same location on tray. For another embodiment, a sensor is disposed on a carriage of the printer for moving an ink jet cartridge attached thereto across the compact disc to deposit an image on the compact disc. The sensor can be used to determine the presence of a compact disc on the tray, whether the compact disc is clamped to the tray, and a dimension of the compact disc, and to perform a calibration method.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. For example, the clamping mechanisms described above can be used for compact disc printers utilizing a thermal transfer head in conjunction with a print ribbon in addition to ink jet disc printers. It will be appreciated that clamping assembly 400 is not limited for use with two studs, e.g., studs 218 and 219. Rather fingers 210 can be used to force the periphery 214 of compact disc 104 against a single stud protruding from the tray surface. Moreover, sensor 310 can be used to perform the methods described above, such as the calibration method, the method of measuring the dimension r of the compact disc 104, the method for determining whether compact disc 104 is clamped, etc., when the compact disc is clamped between one or more clamping fingers 210 and a single stud that protrudes from the surface of tray 102 and engages periphery 214 of the compact disc 104. Accordingly, this application is intended to cover any adaptations or variations of the invention. It is manifestly intended that this invention be limited only by the following claims and equivalents thereof.

What is claimed is:

1. A compact disc printer comprising:
   a movable tray to hold a compact disc for printing upon by the printer;
   at least one clamping finger movably attached to the tray and adapted to selectively engage an outer periphery of the compact disc; and
   a pair of studs protruding from a surface of the tray for engaging a periphery of a hole passing through a center of the compact disc when the at least one clamping finger engages the outer periphery of the compact disc to clamp the compact disc between the at least one clamping finger and the pair of studs.

2. The compact disc printer of claim 1, wherein the at least one clamping finger comprises an extension for indicating when the compact disc is clamped between the at least one clamping finger and the pair of studs.

3. The compact disc printer of claim 1, and further comprising a spring connected between the at least one clamping finger and the tray for biasing the at least one finger against the outer periphery of the compact disc during clamping.

4. The compact disc printer of claim 1, and further comprising a sensor disposed on a carriage of the printer, the carriage adapted to move an ink jet cartridge attached thereto across the compact disc to deposit an image on the compact disc.

5. The compact disc printer of claim 1, wherein the at least one clamping finger is positioned to push the compact disc toward the pair of studs.

6. The compact disc printer of claim 1, and further comprising an adaptor adapted to be disposed between the at least one clamping finger and the outer periphery of the compact disc, wherein the at least one clamping finger is further adapted to selectively engage the adaptor to force the adaptor against the outer periphery of the compact disc so as to force the periphery of the hole passing through a center of the compact disc against the studs.

7. A compact disc printer comprising:
   a movable tray to hold a compact disc for printing upon by the printer;
   a clamping assembly comprising:
     a first shaft rotatably attached to the tray;
     a spring connected between the first shaft and the tray;
     at least one clamping finger mounted on the first shaft;
     a second shaft rotatably attached to the tray; and
     a link movably connected between the first and second shafts; and
   a pair of studs protruding from a surface of the tray for engaging a periphery of a hole passing through a center of the compact disc when the at least one clamping finger engages an outer periphery of the compact disc to clamp the compact disc between the at least one clamping finger and the pair of studs;
   wherein the clamping finger engages the outer periphery of the compact disc in response to rotation of the second shaft.

8. The compact disc printer of claim 7, and further comprising a sensor disposed on a carriage of the printer, the carriage adapted to move an ink jet cartridge attached thereto across the compact disc to deposit an image on the compact disc.

9. The compact disc printer of claim 7, wherein the at least one clamping finger is positioned to push the compact disc toward the pair of studs.

10. The compact disc printer of claim 7, wherein the at least one clamping finger comprises an extension for indicating when the compact disc is clamped between the at least one clamping finger and the pair of studs.

11. The compact disc printer of claim 7, and further comprising a first lug protruding from a stationary surface of the printer for engaging a first actuation arm connected to the second shaft for causing the second shaft to rotate as the tray moves past the first lug.

12. The compact disc printer of claim 11, and further comprising a second lug protruding from the stationary surface of the printer for engaging a second actuation arm connected to the second shaft for causing the second shaft to rotate in an opposite direction as the tray moves in an opposite direction past the second lug, thereby causing the link to rotate the first shaft in an opposite direction, thereby rotating the at least one clamping finger out of engagement with the outer periphery of the compact disc.

* * * * *